(12) United States Patent
Rignér et al.

(10) Patent No.: US 8,714,093 B2
(45) Date of Patent: May 6, 2014

(54) INSTRUMENT PANEL AND BOARD UNIT INTENDED FOR SAME

(75) Inventors: Tomas Rignér, Tumba (SE); Daniel Johansson, Hölö (SE); Joel Åhl, Stockholm (SE); Carl Pantzar, Södertälje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/256,963

(22) PCT Filed: Mar. 15, 2010

(86) PCT No.: PCT/SE2010/050281
§ 371 (c)(1),
(2), (4) Date: Sep. 16, 2011

(87) PCT Pub. No.: WO2010/107371
PCT Pub. Date: Sep. 23, 2010

(65) Prior Publication Data
US 2012/0006235 A1    Jan. 12, 2012

(30) Foreign Application Priority Data
Mar. 19, 2009    (SE) ...................................... 0950174

(51) Int. Cl.
*A47B 23/00*    (2006.01)

(52) U.S. Cl.
USPC ............................. 108/45; 108/63; 296/37.12

(58) Field of Classification Search
USPC ........... 108/44, 45, 63; 312/330.1; 296/37.12, 296/37.8
See application file for complete search history.

(56) References Cited

U.S. PATENT DOCUMENTS

| 2,554,685 | A | * | 5/1951 | St Denis | 108/45 |
| 2,592,032 | A | * | 4/1952 | Henderson | 108/33 |
| 2,719,066 | A | * | 9/1955 | Budzinski | 108/33 |
| 2,771,331 | A | * | 11/1956 | Messman | 108/45 |
| 2,773,705 | A | * | 12/1956 | Hirak | 108/5 |
| 4,792,174 | A | * | 12/1988 | Shioda | 296/37.12 |
| 4,902,061 | A | * | 2/1990 | Plavetich et al. | 296/37.12 |

(Continued)

FOREIGN PATENT DOCUMENTS

DE    4327869 C1    8/1994
WO    WO 2008/100216 A1    8/2008

OTHER PUBLICATIONS

International Search Report dated Apr. 16, 2010, issued in corresponding international application No. PCT/SE2010/050281.

*Primary Examiner* — Daniel Rohrhoff
(74) *Attorney, Agent, or Firm* — Ostrolenk Faber LLP

(57) ABSTRACT

An instrument panel (10) for a motor vehicle, with an upper side comprising a raisable cover (30) which, at a forward edge, as observed in the direction of forward movement of the vehicle, is supported for pivoting relative to a shell (20) of the panel, and with a storage space (40) delineated thereunder. The instrument panel has a board unit (50) which at a transverse edge is supported for pivoting relative to the shell (20) between the cover and the storage space, and comprises a pair of board leaves (60,70) pivotably connected to one another at an opposite transverse edge in such a way that a first board leaf (70) can be deployed, from a retracted working position abutting against the second board leaf (60) under the cover, to a deployed working position situated in a substantially horizontal plane with the second board leaf (60).

9 Claims, 3 Drawing Sheets

(56) References Cited

U.S. PATENT DOCUMENTS

| | | | | |
|---|---|---|---|---|
| 5,337,677 A | * | 8/1994 | Peeno | 108/45 |
| 5,419,265 A | * | 5/1995 | Zimmerman | 108/45 |
| 6,032,587 A | * | 3/2000 | Salenbauch et al. | 108/44 |
| 6,095,060 A | * | 8/2000 | Ma | 108/45 |
| 6,866,319 B2 | * | 3/2005 | Hupfer | 296/37.8 |
| 7,293,507 B2 | * | 11/2007 | DePue et al. | 108/44 |
| 7,980,409 B2 | * | 7/2011 | Vasko et al. | 220/326 |
| 2005/0218681 A1 | * | 10/2005 | DePue et al. | 296/37.12 |

\* cited by examiner

INSTRUMENT PANEL AND BOARD UNIT INTENDED FOR SAME

CROSS-REFERENCE TO RELATED APPLICATIONS

The present application is a 35 U.S.C. §§371 national phase conversion of PCT/SE2010/050281, filed Mar. 15, 2010, which claims priority of Swedish Application No. 0950174-3, filed Mar. 19, 2009, the contents of which are incorporated by reference herein. The PCT International Application was published in the English language.

TECHNICAL FIELD

The invention relates to an instrument panel for a motor vehicle with an upper side comprising a raisable cover which at a forward edge, as observed in the direction of forward movement of the vehicle, is supported for pivoting relative to a shell of the panel, and with a storage space delineated thereunder. The invention relates also to a board unit for such an instrument panel.

BACKGROUND

A known practice is to provide such an instrument panel with a pullout leaf which serves as a workstation for a person who sits in a vehicle seat behind the instrument panel. Such a pullout leaf may, however, hinder access to an underlying space in the instrument panel.

SUMMARY OF THE INVENTION

An object of the invention is to propose a instrument panel of the kind indicated in the introduction which may comprise both a storage space and a board unit which can be retracted into, and not hinder access to, the storage space.

Another object is to propose a compact board unit which is relatively easy to retrofit in the storage space of the instrument panel.

According to a version of the invention, the instrument panel has a board unit which at a transverse edge is supported for pivoting relative to the shell between the cover and the storage space. This makes it possible for the board unit to serve as a further cover above the storage space, so that when the board is raised, it exposes the storage space and when the board is lowered, it serves as a work surface.

The board unit itself comprises a pair of board leaves connected pivotably to one another at an opposite transverse edge in such a way that a first board leaf can be deployed, from a retracted working position abutting against the second board leaf under the cover, to a deployed working position situated in a substantially horizontal plane with the second board leaf. The surface area of the board unit is thus doubled in the deployed working position.

According to an embodiment of the invention, the board unit is supported for pivoting at a forward end of the shell. The board unit will in this case always cover the storage space when it is lowered with board leaves retracted or deployed.

According to another embodiment, the board unit is supported for pivoting at a rear end of the shell. Here again the board unit will cover the storage space when it is deployed forwards, but will expose the storage space in its working position when it is deployed rearwards with board leaves retracted or deployed. In this embodiment, the rearward-deployed board unit protrudes further towards the user in the fully deployed working position. In this case it may therefore also be possible alternatively to use the board unit in a working position half-deployed rearwards, i.e. with the upper leaf remaining in the retracted position.

According to a further embodiment, the board unit is supported for movement along the shell. In this case the unit may be arbitrarily moved rearwards to a desired position of use, with the upper leaf retracted or deployed as desired.

The invention comprises also the board unit itself, which may for example be retrofitted to an instrument panel prepared for the purpose.

Other features and advantages of the invention may be indicated by the description of embodiment examples set out below.

BRIEF DESCRIPTION OF THE DRAWINGS

Items with similar functions have the same reference numbers throughout the drawings.

DETAILED DESCRIPTION OF EMBODIMENT EXAMPLES

Figure 1:
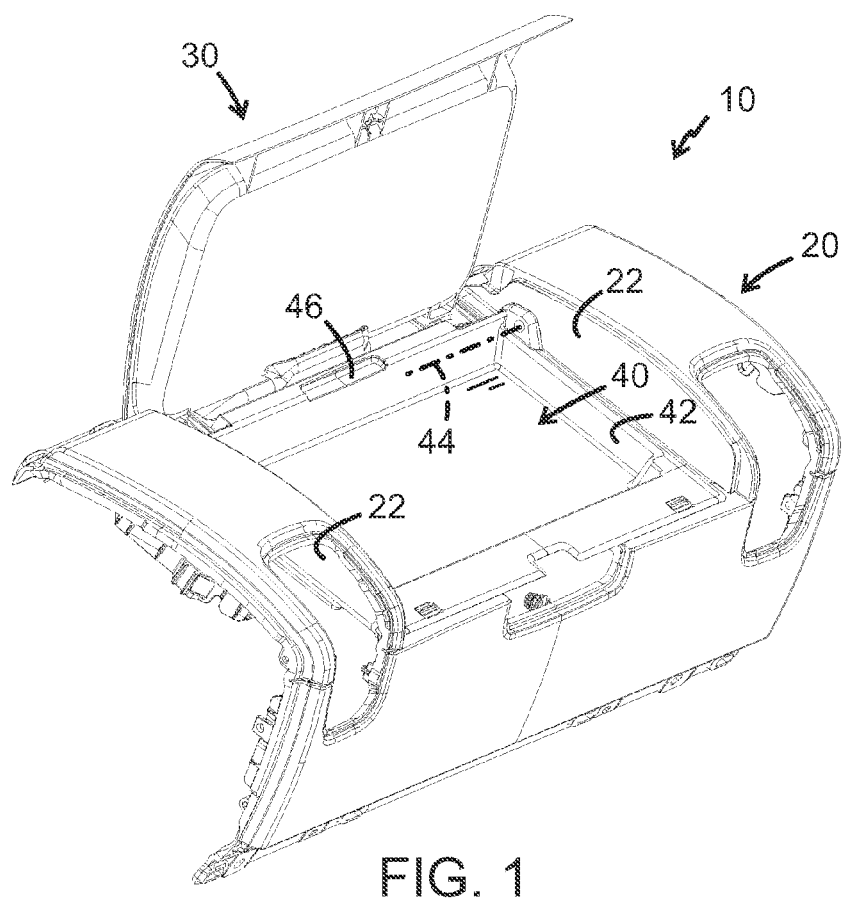
FIG. 1 is a view as seen obliquely from above of an instrument panel module according to the invention with board unit removed.

The module 10 depicted in FIG. 1 is intended to be an integral part of an otherwise undepicted instrument panel at a passenger side in a commercial motor vehicle such as a truck.

The module 10 comprises a moulded plastic shell 20 with an aperture 40 in the upper side which can be closed by a cover 30. The cover 30 has a forward edge 33 which in a manner not depicted in detail is supported for pivoting at opposite sidewalls 22 of the shell 20 to make it possible for the cover to be lowered from the open position depicted in FIG. 1 and close the aperture in the shell 20. A locking mechanism not depicted in detail secures the cover 30 in the lowered position. The cover 30 may have at its upper side a traylike recess 32 (FIGS. 2, 3) for temporary storage of various objects, e.g. paper documents, when the cover 30 is in its undepicted lowered position.

In the aperture there is a traylike insert 42 which delineates a storage space under the cover 30. In a space under the insert 42 there may, within the plastic shell 20, be undepicted vehicle components, e.g. a holder for electrical fuses. At its forward edge 43, the insert 42 is supported for raising via pivot bearings not depicted in detail about an axis 44 at the opposite sidewalls 22 of the shell 20 to allow access to the space under the insert 42. In the bottom of the insert 42 there may be an undepicted rubber mat to prevent articles stored therein from being set in motion and causing noise as a result of vibration generated during operation of the vehicle.

Figure 2:
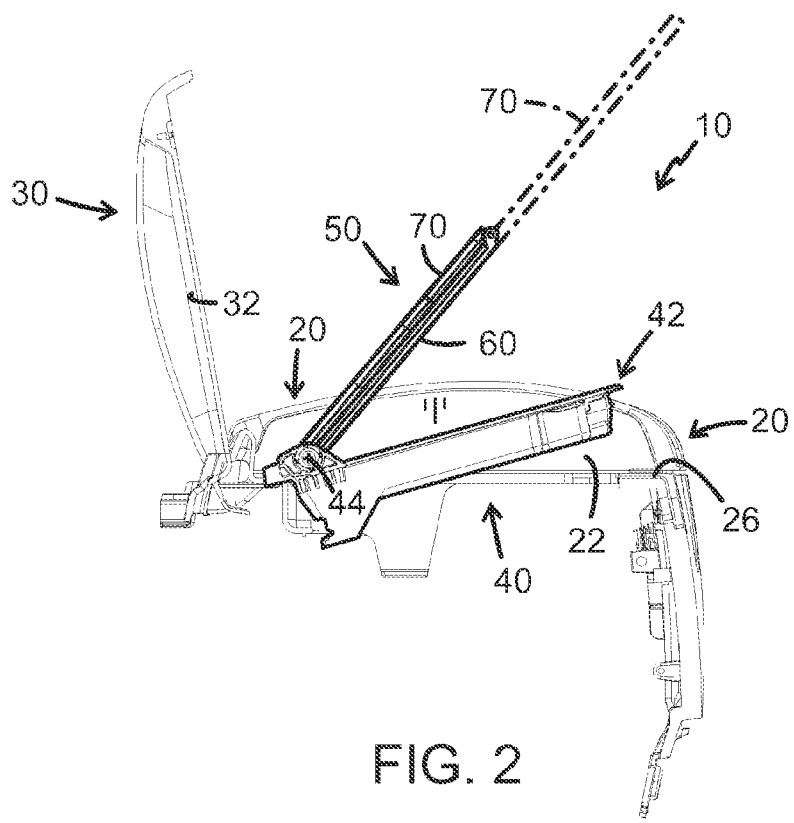
FIG. 2 is a side view partly in section of a module according to FIG. 1 with a board unit fitted and partly pivoted upwards and with an insert partly pivoted upwards.
Figure 3:
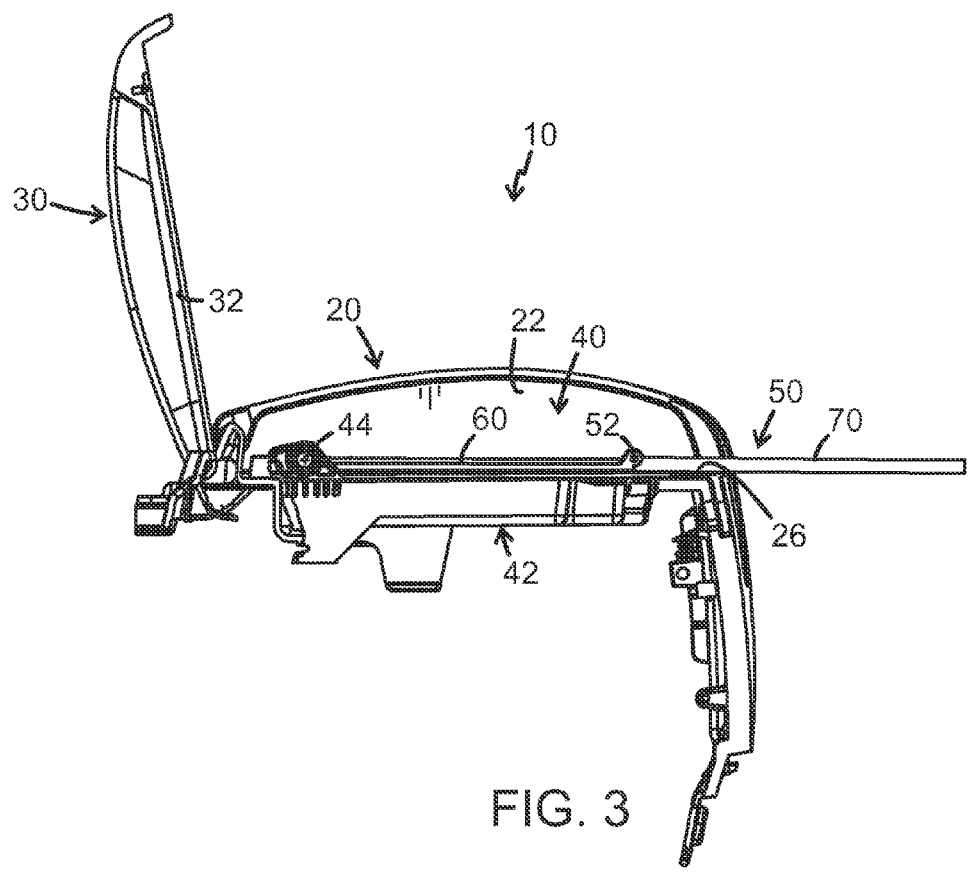
FIG. 3 is a side view corresponding to FIG. 2 with board unit deployed.
Figure 4:
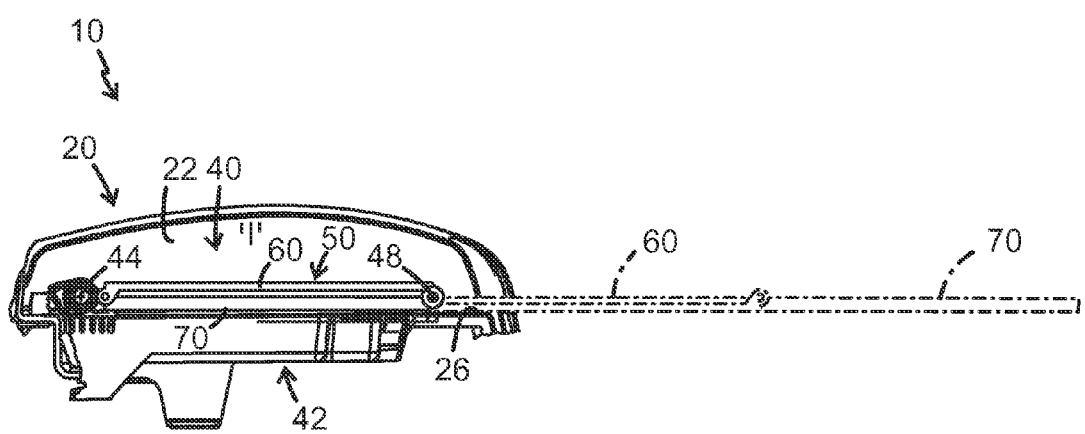
FIG. 4 is a simplified side view corresponding to FIG. 2 with an alternatively fitted board unit.

As may be seen in FIGS. 2-4, a board unit 50 comprising a pair of retractable board leaves 60 and 70 may be fitted in the aperture 40 above the traylike insert 42.

Figure 5:
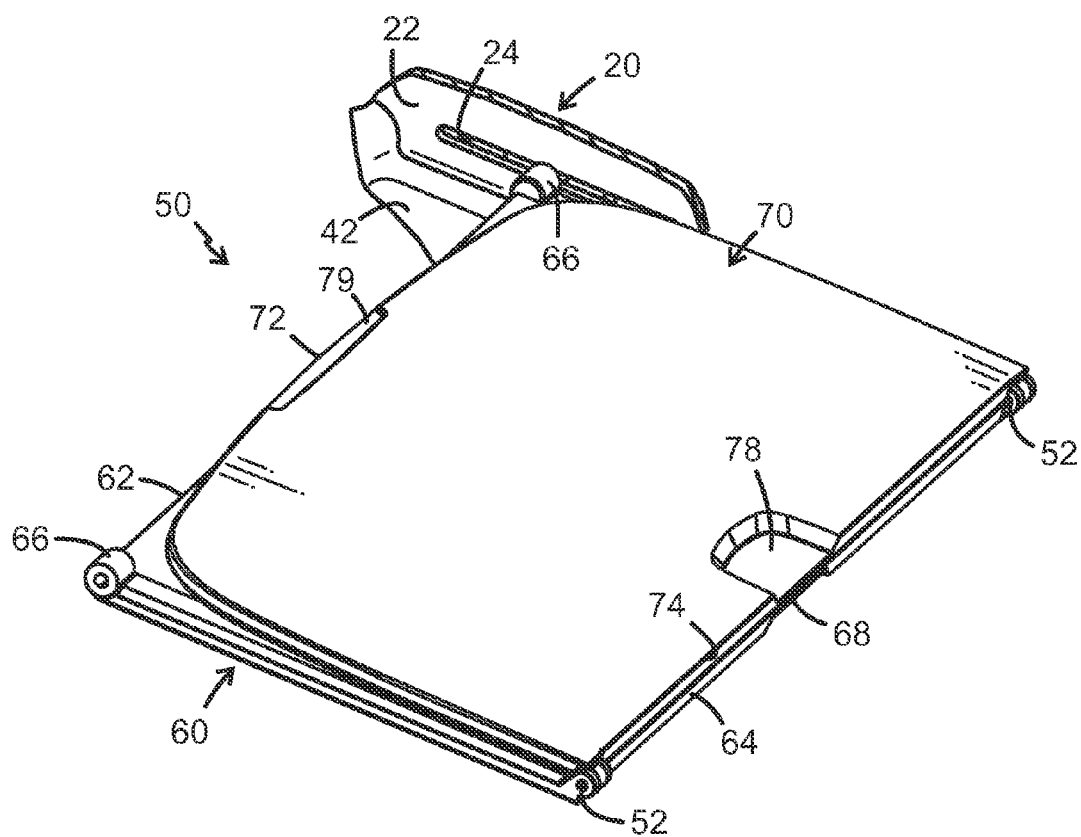
FIG. 5 is a view as seen obliquely from above of a board unit according to the invention.

As most clearly illustrated in FIG. 5, the two board leaves 60 and 70 are connected pivotably to one another by a pair of opposite pivot bearings 52 at a pair of common transverse edges 64 and 74 respectively. The common geometric axis of the pivot bearings 52 is situated approximately in the plane of the mutually facing work surfaces of the leaves 60, 70 so that the edges 64, 74 abut against one another and delineate the deployed working position of the board unit 50, as depicted in, for example, FIG. 3.

Reverting to FIG. 5, the one board leaf 60 has at the transverse edge 62 opposite to the pivot bearings 52 a pair of opposite bearing retainers 66 by which the board unit 50 may be pivotably connected to the opposite sidewalls of the shell 20 by means of suitable undepicted pivot pins.

Figure 6:
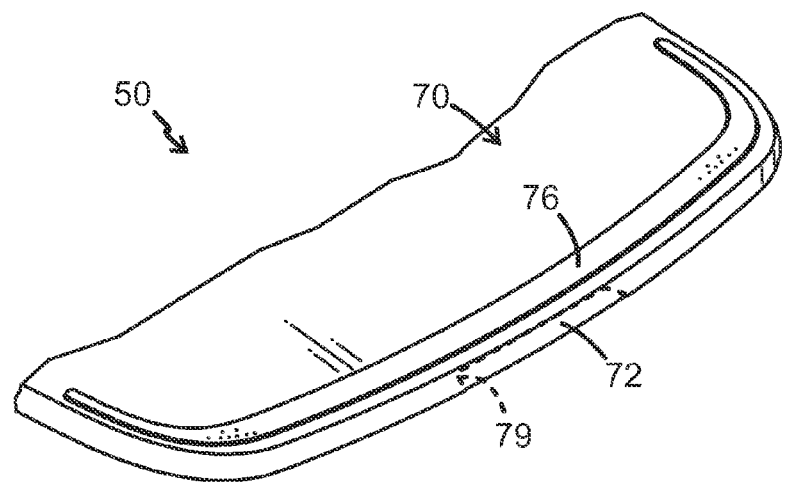
FIG. 6 is a view as seen obliquely from above of a forward portion of a board leaf of a board unit according to the invention.

To facilitate the deployment of the upper board leaf 70 to the rearward-deployed working position depicted in FIG. 3, the free end 72 of the in this case upper board leaf 70 protrudes somewhat, as illustrated in FIG. 5, beyond the forward edge 62 of the lower board leaf 60 so that a user can take hold under the free end 72. As illustrated in FIG. 6, one of the board leaves, e.g. the leaf 70, may have its work surface provided with a rubber strip 76 which protrudes somewhat upwards from the work surface. The rubber strip 76 will then prevent the leaves 60, 70 from vibrating against one another in a retracted state during operation of the vehicle and will also prevent objects from sliding off the work surface.

In the embodiment according to FIGS. 2 and 3, the board unit 50 is supported for pivoting at a forward edge of the shell 20, about the same axis 44 as the insert 42. To expose the insert 42, the user will raise the board unit 50, and to expose the space under the insert 42 the user will raise both the board unit 50 and the insert 42. The board leaf 70 is deployed to the working position in FIG. 3 by the user using his/her fingertips to grasp the forward-protruding free end 72 of the leaf 70. A recess 46 (FIG. 1) at the forward end of the shell 20 provides space for the fingertips. The board unit 50 may itself also be provided with recesses 68, 78, 79 (FIGS. 5, 6) to increase the amount of space for handling by fingertips.

In the embodiment according to FIG. 4, the board unit 50 is supported for pivoting at a rear end of the shell 20, about an axis 48. In this case the leaf 70 will therefore be lowest when in the storage and working position depicted in the form of continuous lines. Deployment to the working position depicted in chain-dotted lines entails the whole board unit being first pivoted 180 degrees about the axis 48 and exposing the insert 42. In this case the board unit 50 may have three working positions: 1) a working position with the unit 50 deployed forwards in the shell 20, whereby the underside of the board leaf 60 may serve as a work surface, 2) a working position with the unit 50 deployed rearwards but with the leaves 60, 70 retracted, and 3) a working position with the unit 50 deployed rearwards and with the leaf 70 deployed from the leaf 60. In this embodiment it is also conceivable for the insert 42 to be supported for pivoting about the rear pivot axis 48 (not depicted).

As indicated in a simplified form in FIG. 5, it is also possible for a continuously pivotable board unit 50 to be guided in opposite longitudinal guides 24, e.g. grooves (only one is depicted in FIG. 5), in the walls 22 of the shell 20. In that case the board unit 50 will thus be capable of being pulled out, being raised and being deployed, with the possibility of also using any desired intermediate working positions. Each longitudinal guide 24 may extend beyond the rear edge of the insert 42 so that the insert can be retracted when the board unit 50 is in its pushed-rearwards position. It is also possible for the longitudinal guide 24 to be firmly connected to the raisable insert 42.

In all the working positions of the various embodiments, at least part of the board unit 50 is supported by a horizontal support surface 26 (FIGS. 2-4) of the shell 20.

Unless the board unit 50 is already fitted, the opposite walls 22 of the storage space at the time of delivery of the vehicle may optionally be provided with one or two sets of undepicted bearing retainers/apertures—or longitudinal guides—for possible retrofitting of the board unit 50 in any of the ways described above.

The description set out above is primarily intended to facilitate comprehension and no unnecessary limitations of the invention are to be inferred therefrom. The modifications which will be obvious to one skilled in the art from perusing the description may be implemented without departing from the concept of the invention or the scope of the claims set out below.

The invention claimed is:

1. A panel with a board unit, the panel including a shell with an upper side, the panel further including
 a raisable cover at and over the upper side, the cover having a forward edge in a forward direction, the forward edge of the cover being supported, at opposite sidewalls of the shell, for pivoting relative to the shell, and the shell including a storage space delineated under the cover;
 the board unit having a first transverse edge at which the board unit is supported for pivoting relative to the shell and the board unit being between the cover and the storage space, the board unit comprising:
  a pair of board leaves, each of the board leaves having a second respective transverse edge, the second transverse edges being pivotably connected to one another, the second transverse edges being located opposite the first transverse edge such that a first one of the pair of board leaves can be deployed from a retracted working position abutting against a second one of the pair of board leaves under the cover, to a deployed working position with the first board leaf situated in a substantially horizontal plane with the second board leaf, the second board leaf being connected to the opposite sidewalls of the shell by pivoting connections, the second board leaf not being radially moveable with respect to the pivoting connections.

2. A panel according to claim 1, wherein the board unit is supported for pivoting at a forward end of the shell toward the forward edge of the cover.

3. A panel according to claim 1, wherein the board unit is supported for pivoting at a rear end of the shell away from the forward edge of the cover.

4. A panel according to claim 1, wherein the board unit is supported for movement along the shell with respect to the forward edge of the cover.

5. A panel according to claim 1, wherein the storage space is delineated by a tray inserted in the shell.

6. A panel according to claim 5, wherein the inserted tray is supported for pivoting at a forward end of the shell toward the forward edge of the cover.

7. A panel according to claim 1, wherein the first board leaf in the deployed working position extends from its second respective transverse edge in a direction away from the forward edge of the raisable cover.

8. A panel according to claim 1, wherein the raisable cover pivots relative to the shell about a first axis and the board unit pivots relative to the shell about a second axis, the first axis being spaced away from the second axis.

9. A panel with a board unit, the panel including a shell with an upper side, the panel further including a raisable cover at and over the upper side, the cover having a forward edge in a forward direction, the forward edge of the cover being supported, at opposite sidewalls of the shell, for pivoting about a first axis relative to the shell, and the shell including a storage space delineated under the cover;

the board unit having a first transverse edge at which the board unit is supported for pivoting about a second axis relative to the shell and the board unit being between the cover and the storage space, the board unit comprising:

a pair of board leaves, each of the board leaves having a second respective transverse edge, the second transverse edges being pivotably connected to one another, the second transverse edges being located opposite the first transverse edge such that a first one of the pair of board leaves can be deployed from a retracted working position abutting against a second one of the pair of board leaves under the cover, to a deployed working position with the first board leaf situated in a substantially horizontal plane with the second board leaf, the first axis being spaced away from the second axis.

* * * * *